US007822405B2

(12) United States Patent
Alon et al.

(10) Patent No.: US 7,822,405 B2
(45) Date of Patent: Oct. 26, 2010

(54) POWER SAVING IN VOIP TRANSMISSION APPARATUS, SYSTEMS, AND METHODS

(75) Inventors: Ayelet Alon, Haifa (IL); Boris Ginzburg, Haifa (IL)

(73) Assignee: Intel Corporation, Santa Clara, CA (US)

( * ) Notice: Subject to any disclaimer, the term of this patent is extended or adjusted under 35 U.S.C. 154(b) by 666 days.

(21) Appl. No.: 11/393,090

(22) Filed: Mar. 30, 2006

(65) Prior Publication Data

US 2007/0238439 A1    Oct. 11, 2007

(51) Int. Cl.
*H04B 7/005* (2006.01)
*H04B 1/38* (2006.01)

(52) U.S. Cl. .............. 455/343.2; 455/343.4; 455/522; 455/574; 370/311

(58) Field of Classification Search .............. 455/343.2, 455/574, 522
See application file for complete search history.

(56) References Cited

U.S. PATENT DOCUMENTS

| 6,917,598 | B1 * | 7/2005 | Emeott et al. ............... 370/311 |
| 2004/0001477 | A1 | 1/2004 | D'Amico et al. |
| 2004/0081133 | A1 * | 4/2004 | Smavatkul et al. .......... 370/311 |
| 2004/0190467 | A1 * | 9/2004 | Liu et al. .................... 370/311 |
| 2004/0264396 | A1 * | 12/2004 | Ginzburg et al. ............ 370/311 |
| 2005/0138451 | A1 * | 6/2005 | Simpson et al. ............. 713/320 |
| 2005/0152324 | A1 * | 7/2005 | Benveniste ............... 455/343.4 |
| 2005/0185613 | A1 * | 8/2005 | Kowalski et al. ............ 370/329 |
| 2005/0197148 | A1 * | 9/2005 | Ali et al. .................... 455/522 |
| 2006/0252449 | A1 * | 11/2006 | Ramesh ...................... 455/522 |
| 2007/0002782 | A1 * | 1/2007 | Kneckt et al. ............... 370/282 |
| 2007/0004374 | A1 * | 1/2007 | Kneckt ...................... 455/343.1 |
| 2007/0147330 | A1 * | 6/2007 | Smith et al. ................. 370/346 |
| 2007/0161364 | A1 * | 7/2007 | Surineni et al. .......... 455/343.4 |
| 2007/0191052 | A1 * | 8/2007 | Kneckt et al. ............... 455/522 |
| 2007/0259700 | A1 * | 11/2007 | Meier et al. ................. 455/574 |

FOREIGN PATENT DOCUMENTS

| KR | 10-0490492 | 5/2005 |
| WO | WO-2007/117904 A1 | 10/2007 |

OTHER PUBLICATIONS

Author: Ramesh, Sridhar; Title: Adaptive APSD: A Low Power Scheduling Protocol for IEEE 802.11 Wireless LANs; Date: Jan. 8-12, 2006; pp. 1-5.*
"Cisco Documentation; Chapter 1: Overview of the Session Initiation Protocol", http://www.cisco.com/univercd/cc/td/doc/product/voice/sipsols/bigguIp/bgsipov.htm, (Sep. 28, 2002),1-7.

(Continued)

*Primary Examiner*—Nick Corsaro
*Assistant Examiner*—Tangela T. Chambers
(74) *Attorney, Agent, or Firm*—Schwegman, Lundberg & Woessner, P.A.

(57) ABSTRACT

An apparatus, includes a wireless communication module (WCM) to communicatively couple to a wireless access point; and an automatic power-save delivery (APSD) state logic module to establish a dynamic configuration mechanism to change a U-APSD state affecting voice signaling traffic at a beginning of a voice stream and again at an end of the voice stream.

9 Claims, 3 Drawing Sheets

OTHER PUBLICATIONS

Chesson, Greg, "How to Use VoIP on your Wireless LAN", http://www.networkcomputing.com/article/printFullArticle.jhtml?articleID=164300466, (May 31, 2005),1-5.

Chung, Simon, et al., "Understanding the MAC impact of 802.11e: Part 2", http://www.iks.inf.ethz.ch/education/ss04/seminar/212.pdf, (Oct. 30, 2003),1-7.

Godfrey, Tim, "Inside 802.11e: Making QoS a Reality over WLAN Connections", http://www.commsdesign.com/showArticle.jhtml;jsessionid=GTFTRX3F10O2QQSNDLOSKH0CJUNN2J-VN?articleID=17000388, (Dec. 19, 2003),1-9.

Liaw, Guan-Hsiung, "An Overview of 802.11e", http://netlab18.cis.nctu.edu.tw/html/wlan_course/powerpoint/802.11e.pdf, (Oct. 27, 2005),1-70.

"PCT Application No. PCT/US2007/064484, International Search Report mailed Sep. 4, 2007", 4 pgs.

"PCT Application No. PCT/US2007/064484, Written Opinion mailed Sep. 4, 2007", 7 pgs.

"Session Initiation Protocol (SIP)", [on-line]. [archived Apr. 12, 2005]. Retrieved from the Internet: <URL: http://web.archive.org/web/20050412034847/http://www.cisco.com/warp/public/cc/techno/tyvdve/sip/index.shtml>, 3 pgs.

* cited by examiner

POWER SAVING IN VOIP TRANSMISSION APPARATUS, SYSTEMS, AND METHODS

TECHNICAL FIELD

Various embodiments described herein relate to digital communications generally, including apparatus, systems, and methods used in packet-switched wireless voice communications.

BACKGROUND INFORMATION

Digital voice communications may be implemented in a packet-switched network. Methods associated with two such implementations may include those defined in voice over Internet protocol (VoIP) specifications H.323 and Internet Engineering Task Force (IETF) Request for Comments (RFC) 2543. Additional information regarding H.323 may be found in International Telecommunication Union (ITU) Standard H.323—Version 5 "Packet-based Multimedia Communications Systems" (July 2003). Additional information regarding a session initiation protocol (SIP) may be found in IETF RFC 2543, "SIP: Session Initiation Protocol" (1999).

H.323 and session initiation protocol definitions may include voice signaling methods such as initiating, modifying, and terminating a voice call. Signaling traffic may be present on a link whether or not active voice traffic is present on the link, and can be sensitive to delay. While voice packets may be sent using a real-time protocol, perhaps implemented with a user datagram protocol, signaling packets are usually sent through a transport control protocol.

These factors may be particularly significant as they relate to wireless packet transmission methods such as those incorporated in an Institute of Electrical and Electronics Engineers (IEEE) 802.11 standard and in an IEEE 802.11E standard. Additional information regarding the IEEE 802.11 standard may be found in "ANSI/IEEE Std. 802.11, Information technology—Telecommunications and information exchange between systems—Local and metropolitan area networks—Specific requirements—Part 11: Wireless LAN Medium Access Control (MAC) and Physical Layer (PHY) Specifications" (published 1999; reaffirmed June 2003). Additional information regarding the IEEE 802.11E standard may be found in "IEEE 802.11E Standard for Information technology—Telecommunications and information exchange between systems—Local and metropolitan area networks—Specific requirements Part 11: Wireless LAN Medium Access Control (MAC) and Physical Layer (PHY) specifications: Amendment 8: Medium Access Control (MAC) Quality of Service Enhancements (published 2005).

Voice and signaling packets may be prioritized differently according to quality of service (QoS) methods defined in the 802.11E standard. Voice packets may be sent with an access category-voice (AC-VO) channel access category that is prioritized relatively higher than an access category-video (AC-VI) channel access category used for voice signaling.

Such differential prioritization of voice and signaling packets may be considered together with a state of reduced power consumption referred to as a power-save mode of operation. The power-save mode of operation may be utilized by a battery-powered wireless device to extend an operating time between battery recharge cycles.

A particular type of power-save mode of operation referred to as an automatic power-save delivery (APSD) mode is described in the IEEE 802.11E standard. APSD is a mechanism for delivery of downlink frames from a wireless access point operating in a QoS mode (a "QAP") to a station (STA) operating in both the QoS mode and in the power-save mode (a "QSTA"). Although two APSD sub-modes are described, scheduled and unscheduled, the unscheduled or "triggered" (U-APSD) mode may predominate in commercial applications.

A QSTA operating in the U-APSD mode may awaken periodically for a service period of time. A service period is a contiguous period of time during which a set of one or more downlink frames is sent to one or more QSTAs.

The IEEE 802.11E specification defines two attributes associated with access category traffic, trigger-enabled access category and delivery-enabled access category. Trigger-enabled access category refers to an attribute associated with traffic in the uplink. A packet in the uplink associated with a trigger-enabled access category may trigger an unscheduled service period if one is not already in progress. When an access category associated with a QAP is delivery-enabled, the QAP may be allowed to deliver traffic associated with the access category to a QSTA in an unscheduled service period triggered by the QSTA.

An unscheduled service period may begin when the QAP receives a QoS-data packet (e.g., a prioritized voice packet or a prioritized voice signaling packet) or a QoS-null packet associated with an active access category in the uplink. An access category may be thought of as a level of priority associated with a particular class of traffic. The unscheduled service period may end when the QSTA receives a QoS data packet or a QoS null packet with an end of service period (EOSP) subfield set to 1 in the downlink. Once the QAP has received an acknowledgment to the latter packet, the QAP ceases transmission of packets to the QSTA using this mechanism until the next service period. Unscheduled APSD thus requires a traffic stream of QoS data or QoS null packets in the uplink to trigger a transmission of traffic in the downlink.

The QAP may buffer delivery enabled traffic until it receives a packet from the QSTA associated with a trigger enabled access category. The QAP may then transmit the buffered packets to the QSTA. Buffered traffic associated with an access category with a U-APSD attribute set to "non-delivered" may continue to be buffered at the QAP and may not be forwarded to the QSTA upon a receipt at the QAP of the packets associated with the trigger-enabled AC. The QAP may notify the QSTA about buffered non-delivered traffic using a deliver traffic information message (TIM) in a beacon packet associated with a standard, non-APSD power-save mode of operation. A TIM may not be set for traffic associated with a delivered traffic access category unless all ACs are delivery enabled, however. The QSTA should thus use upstream traffic to trigger a delivery of traffic from the QAP buffer.

A problem with using VoIP with U-APSD may result from the fact that that the 802.11E standard was designed with voice streams in mind, but does not necessarily define how the QSTA can receive unexpected downstream signaling traffic to initiate a voice stream. Although static access category configurations may be implemented, these may result in large delays to signaling traffic and/or increased power consumption when coupled with APSD use. A user may experience symptoms of a bad call connection attempt (e.g., an "other side not available" or a "line broken" indication).

DETAILED DESCRIPTION

Figure 1:
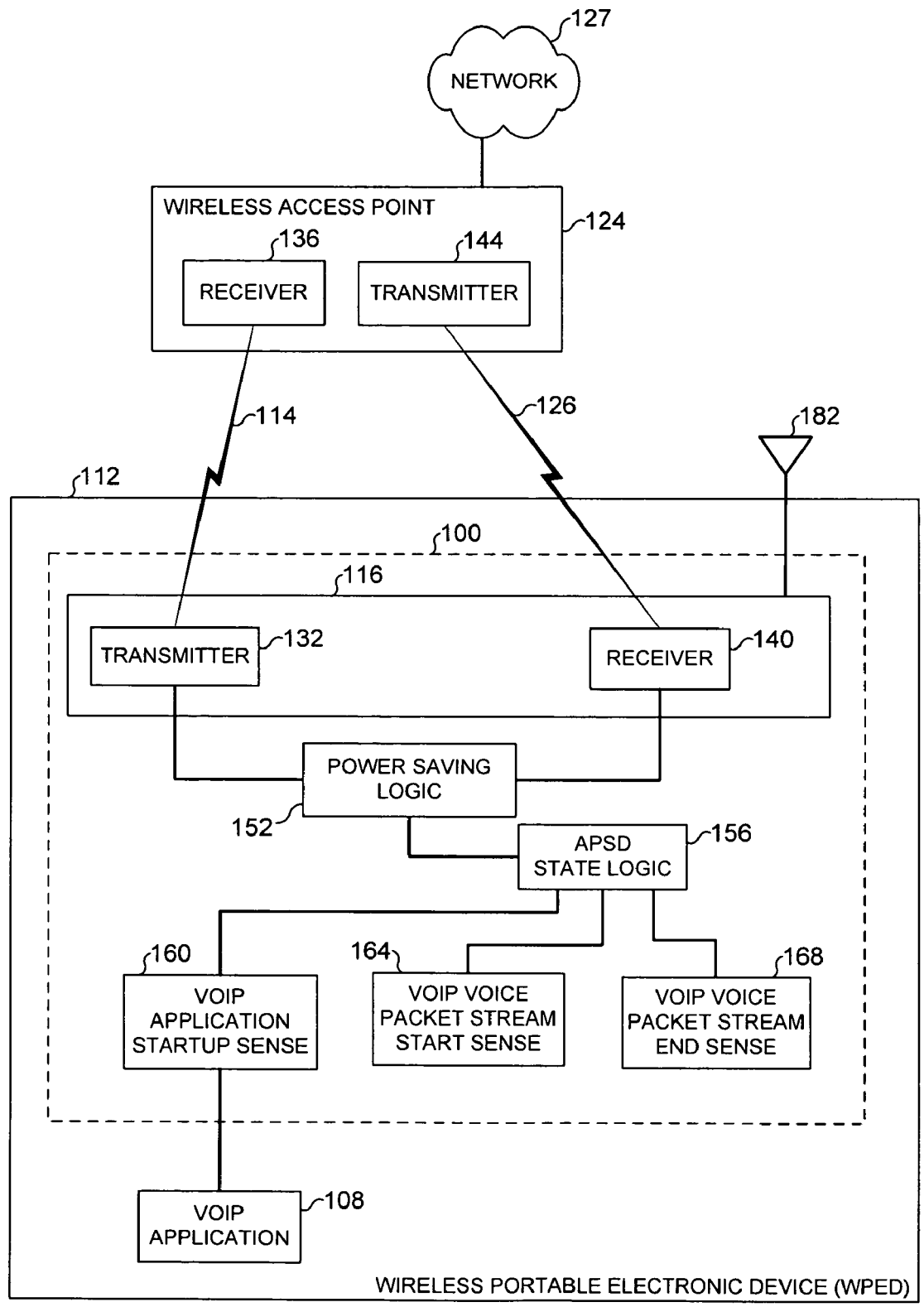
FIG. 1 is a block diagram of an apparatus and a representative system according to various embodiments.

FIG. 1 comprises a block diagram of an apparatus 100 and a system 180 according to various embodiments of the invention. The apparatus 100 and the system 180 may dynamically switch a power saving mode of operation between a legacy power-save mode and an APSD mode based upon whether or not a voice packet stream is pending transmission. Lower latencies associated with downlink voice signaling traffic may result.

A dynamic configuration mechanism may be established to change a U-APSD state affecting voice signaling traffic at a beginning of a voice stream and again at an end of the voice stream. When a VoIP application 108 initializes in a wireless portable electronic device (WPED) 112, the application 108 may open a voice signaling traffic stream. The WPED 112 may comprise a personal digital assistant, a handheld computer, a laptop computer, or a mobile telephone, among other wireless portable electronic devices.

The voice signaling traffic stream may traverse an uplink 114 from a wireless communication module (WCM) 116 associated with the WPED 112 to a wireless access point 124. The VoIP application 108 may configure an AC-VI associated with voice signaling traffic in a downlink 126 as non-APSD. In this mode, voice signaling traffic may be delivered to the WCM 116 according to a legacy power-save mode of operation. That is, the wireless access point 124 may buffer voice signaling packets for the WPED 112 while the WCM 116 operates in the power save mode. The wireless access point 124 may send a notification to the WCM 116 as to an availability of buffered voice signaling traffic in a TIM field of a beacon packet. The WCM 116 may wake up periodically to retrieve the TIM indication and to receive the signaling traffic.

When the VoIP application 108 opens a voice call and sends a voice stream to the WCM 116 for transmission, some embodiments may configure an AC-VO as trigger-enabled and delivery-enabled by sending an add traffic stream (ADDTS) control packet. The AC-VI may also be re-configured to a delivery-enabled APSD mode. With the link thus configured to operate in the APSD mode, the WCM 116 may transmit the voice stream in the uplink 114. The voice stream in the uplink 114, corresponding to the AC-VO, may trigger a delivery of buffered packets in the downlink 126. That is, the wireless access point 124 may transmit both buffered voice packets and buffered voice signaling packets, if any, in the downlink 126. Both voice traffic and signaling traffic may be sent in the downlink 126, since both AC-VO and AC-VI are enabled.

When the VoIP application 108 ends the voice call, some embodiments may re-configure both the AC-VI and the AC-VO as non-APSD. The re-configuration may be accomplished by sending a delete traffic stream (DELTS) control packet, with a U-APSD parameter reset, to the wireless access point 124 for each AC. Following a receipt of the DELTS packets, signaling traffic may be delivered to the WCM 116 using legacy power-save methods.

Some embodiments may thus transition from an APSD mode of power-saving operation to a legacy power-save mode when no voice stream traffic is pending transmission. The APSD mode of operation may then be resumed when another voice stream becomes pending. It may be advantageous to dynamically change the power-saving mode because, absent any traffic in the uplink 114, the WCM 116 may periodically transmit a trigger packet in the uplink 114. The trigger packet may be transmitted to ensure that any traffic buffered at the wireless access point 124 is buffered for no longer than a period between trigger packets. However, the latter period may typically be shorter than a beacon interval period. Thus, a lower power consumption is obtained for downlink voice signaling traffic by operating in the legacy power-save mode when no voice packets are pending transmission in the uplink 114.

The apparatus 100 may thus include the WCM 116. The WCM 116 may be capable of wirelessly coupling to the wireless access point 124 to facilitate data exchange between the WPED 112 and a network 127 coupled to the wireless access point 124. More specifically, a WCM transmitter 132 may be capable of communicatively coupling to a receiver 136 in the wireless access point 124 to create the uplink 114. A WCM receiver 140 may be capable of communicatively coupling to a transmitter 144 in the wireless access point 124 to create the downlink 126.

A power saving logic module 152 may be coupled to the WCM transmitter 132, the WCM receiver 140, or both. The power saving logic module 152 may disable the WCM transmitter 132, the WCM receiver 140, or some other portion of the WCM 116. These portions of the WCM 116 may be disabled for a sleep period if no traffic is pending transmission from the WCM 116 or from the wireless access point 124.

An APSD state logic module 156 may be coupled to the power saving logic module 152. The APSD state logic module 156 may dynamically control an APSD state of the WCM 116. That is, the APSD state logic module 156 may control whether the WCM 116 operates in a U-APSD mode or in a non-APSD mode. The APSD state logic module 156 may choose a power saving mode based upon an indication that a VoIP voice packet stream is pending transmission at the WCM 116. The state logic module 156 may dynamically determine which access categories are trigger enabled and which access categories are delivery enabled.

The apparatus 100 may also include a VoIP application startup sense module 160 coupled to the APSD state logic module 156. The VoIP application startup sense module 160 may sense an initialization of the VoIP application 108. The VoIP application startup sense module 160 may consequently signal the APSD state logic module 156 to initiate an operation of the WCM 116 in an APSD disabled mode.

The apparatus 100 may further include a VoIP voice packet stream start sense module 164 coupled to the APSD state logic module 156. The VoIP voice packet stream start sense module 164 may sense that a VoIP voice packet stream is ready for transmission from the WCM 116. The VoIP voice packet stream start sense module 164 may consequently signal the APSD state logic module 156 to initiate an operation of the WCM 116 in an APSD enabled mode.

A VoIP voice packet stream end sense module 168 may also be coupled to the APSD state logic module 156. The VoIP voice packet stream end sense module 168 may sense a termination of the transmission of the VoIP voice packet stream. The VoIP voice packet stream end sense module 168 may consequently signal the APSD state logic module 156 to initiate an operation of the WCM 116 in an APSD disabled mode.

In another embodiment, a system 180 may include one or more of the apparatus 100, as previously described. The system 180 may also include an antenna 182 coupled to the WCM 116. The antenna 182 may communicatively couple the WCM 116 to the wireless access point 124. The antenna 182 may comprise a patch, omnidirectional, beam, monopole, dipole, or slot antenna, among other types.

Any of the components previously described can be implemented in a number of ways, including embodiments in software. Thus, the apparatus 100; VoIP application 108; WPED 112; uplink 114; WCM 116; wireless access point 124; downlink 126; network 127; transmitters 132, 144; receivers 136, 140; power saving logic module 152; APSD state logic module 156; VoIP application startup sense module 160; VoIP voice packet stream start sense module 164; VoIP voice packet stream end sense module 168; system 180; and antenna 182 may all be characterized as "modules" herein.

The modules may include hardware circuitry, single or multi-processor circuits, memory circuits, software program modules and objects, firmware, and combinations thereof, as desired by the architect of the apparatus 100 and the system 180 and as appropriate for particular implementations of various embodiments.

The apparatus and systems of various embodiments may be useful in applications other than decreasing a latency associated with a receipt of buffered voice signaling traffic associated with wireless VoIP communications. Thus, various embodiments of the invention are not to be so limited. The illustrations of the apparatus 100 and the system 180 are intended to provide a general understanding of the structure of various embodiments. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

Figure 2:
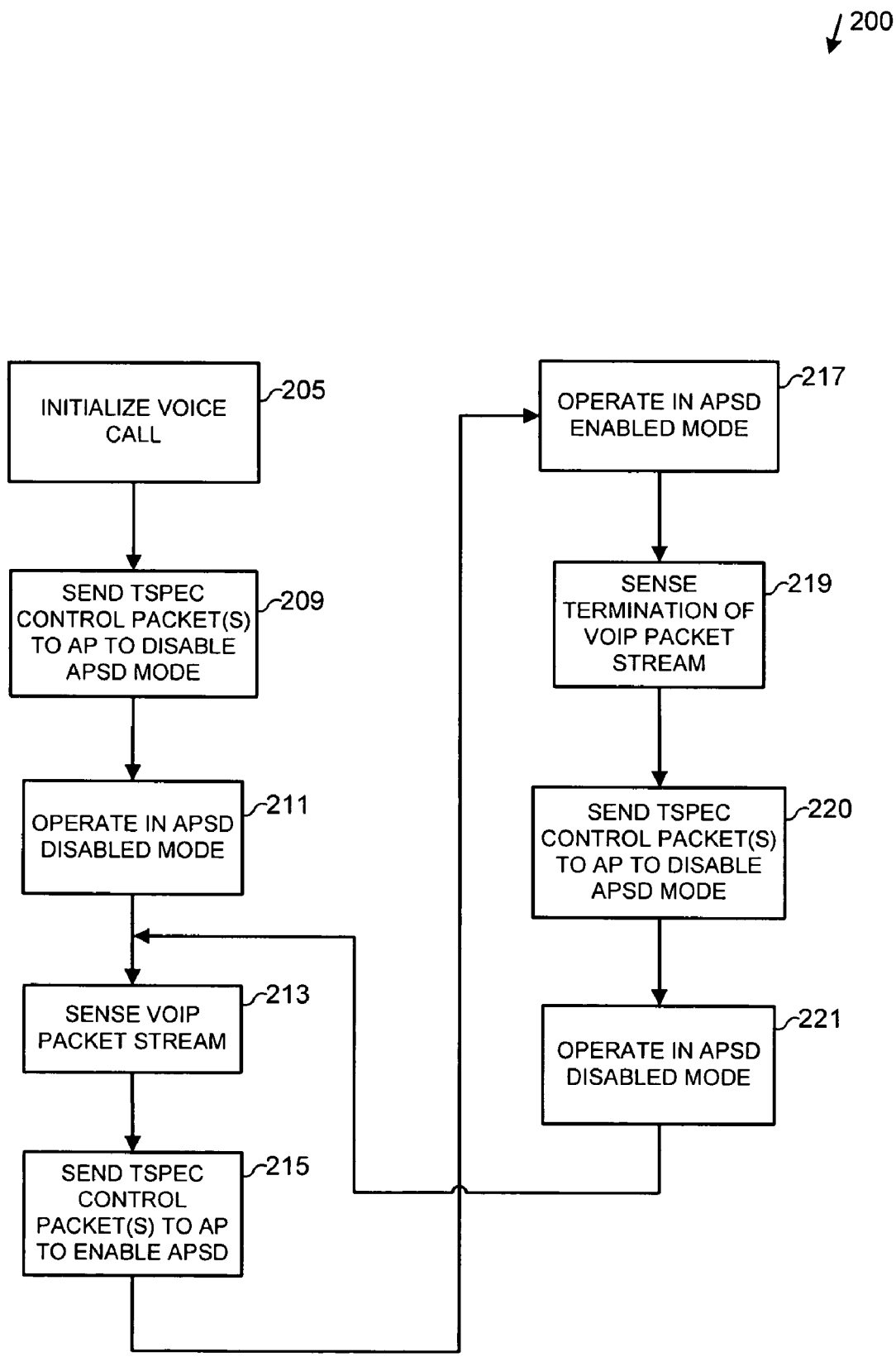
FIG. 2 is a flow diagram illustrating several methods according to various embodiments.

FIG. 2 is a flow diagram illustrating several methods according to various embodiments. A WCM may be associated with a WPED, including, for example, a personal digital assistant, a handheld computer, a laptop computer, and a mobile telephone, among other wireless portable electronic devices. Turning back to FIG. 1, for example, the WCM 116 may be associated with the WPED 112. The WCM 116 may be capable of wirelessly coupling to a wireless access point 124 to facilitate data exchange between the WPED 112 and a network 127 coupled to the wireless access point 124.

A method 200 may begin at block 205 with initializing a VoIP application to execute in the WPED. Alternatively, the WCM, a driver associated with the WCM, or both may initiate a state associated with a start of a voice call. The method 200 may continue at block 209 with sending one or more traffic stream specification (TSPEC) control packets from the WCM to the wireless AP. The TSPEC control packet(s) may be sent with an APSD bit reset, to advise the wireless AP to operate in an APSD disabled mode.

The method 200 may include operating the WCM in the APSD disabled mode, at block 211. Operating in the APSD disabled mode, the WCM (a) may not deliver downlink voice signaling traffic in response to either uplink voice traffic or uplink voice signaling traffic; (b) may not use uplink voice signaling traffic to trigger a delivery of either downlink voice traffic or downlink voice signaling traffic; (c) may not deliver downlink voice traffic in response to either uplink voice traffic or uplink voice signaling traffic; and (d) may not use uplink voice traffic to trigger a delivery of either downlink voice traffic or downlink voice signaling traffic.

The method 200 may also include sensing that a VoIP voice packet stream is ready for transmission from the WCM, at block 213. The method 200 may further include sending one or more TSPEC control packets from the WCM to the wireless AP, at block 215. The TSPEC control packet(s) may be sent with an APSD bit set, to advise the wireless AP to operate in an APSD enabled mode. The APSD enabled mode may comprise disabling transmitter operation, receiver operation, or both at the WCM. The transmitter and/or receiver operation may be disabled for a sleep period if no traffic is pending transmission from either the WPED or from the wireless AP. In some embodiments, the APSD enabled mode may comprise an unscheduled APSD mode of operation.

The method 200 may continue with operating the WCM in the APSD enabled mode, at block 217. Operating in the APSD enabled mode, the WCM (a) may deliver downlink voice signaling traffic in response to uplink voice traffic; (b) may not use uplink voice signaling traffic to trigger a delivery of either downlink voice traffic or downlink voice signaling traffic; (c) may deliver downlink voice traffic in response to uplink voice traffic; and (d) may use uplink voice traffic to trigger a delivery of downlink voice traffic, downlink voice signaling traffic, or both.

The method 200 may include sensing a termination of the transmission of the VoIP voice packet stream, at block 219. The method 200 may also include sending one or more TSPEC control packets with the APSD bit reset, to advise the wireless AP to operate in an APSD disabled mode, at block 220. An iteration of the method 200 may conclude with operating the WCM in the APSD disabled mode, at block 221. Additional iterations may occur as additional voice packet streams are sensed, beginning at block 213.

In some embodiments disclosed herein, the WCM may perform some activities according to an IEEE standard 802.11E. It may be possible to execute the activities described herein in an order other than the order described. And, various activities described with respect to the methods identified herein can be executed in repetitive, serial, or parallel fashion.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment. Thus, other embodiments may be realized, as discussed regarding FIG. 3 below.

Figure 3:
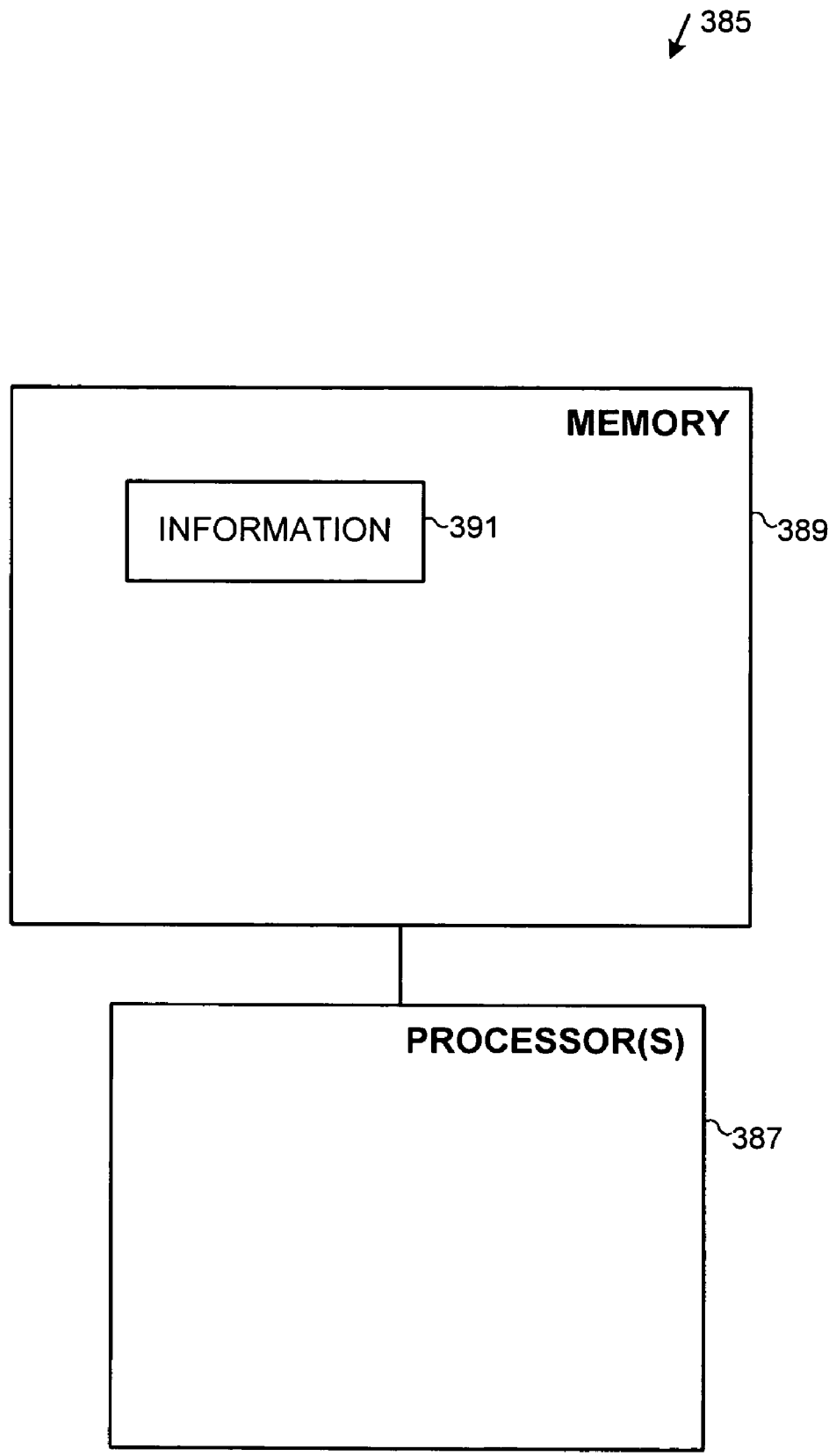
FIG. 3 is a block diagram of an article according to various embodiments.

FIG. 3 is a block diagram of an article 385 according to various embodiments of the invention. Examples of such embodiments may comprise a computer, a memory system, a magnetic or optical disk, some other storage device, or any type of electronic device or system. The article 385 may include one or more processor(s) 387 coupled to a machine-accessible medium such as a memory 389 (e.g., a memory including electrical, optical, or electromagnetic elements). The medium may contain associated information 391 (e.g., computer program instructions, data, or both) which, when accessed, results in a machine (e.g., the processor(s) 387) performing the activities previously described.

Implementing the apparatus, systems, and methods disclosed herein may dynamically switch a power saving mode of operation between a legacy power-save mode and an APSD mode based upon whether or not a voice packet stream is pending transmission. Lower latencies associated with downlink voice signaling traffic and a reduced power consumption may result.

Although the inventive concept may include embodiments described in the exemplary context of an IEEE standard 802.xx implementation (e.g., 802.11, 802.11a, 802.11b, 802.11E, 802.11g, 802.16, etc.), the claims are not so limited. Additional information regarding the IEEE 802.11a protocol standard may be found in IEEE Std 802.11a, Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications—High-speed Physical Layer in the 5 GHz Band (published 1999; reaffirmed Jun. 12, 2003). Additional information regarding the IEEE 802.11b protocol standard may be found in IEEE Std 802.11b, Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band (approved Sep. 16, 1999; reaffirmed Jun. 12, 2003). Additional information regarding the IEEE 802.11g protocol standard may be found in IEEE Std 802.11g™, IEEE Standard for Information technology—Telecommunications and information exchange between systems—Local and metropolitan area networks—Specific requirements Part 11: Wireless LAN Medium Access Control (MAC) and Physical Layer (PHY) specifications Amendment 4: Further Higher Data Rate Extension in the 2.4 GHz Band (approved Jun. 12, 2003). Additional information regarding the IEEE 802.16 protocol standard may be found in IEEE Standard for Local and Metropolitan Area Networks—Part 16: Air Interface for Fixed Broadband Wireless Access Systems (published Oct. 1, 2004).

Embodiments of the present invention may be implemented as part of any wired or wireless system. Examples may also include embodiments comprising multi-carrier wireless communication channels (e.g., orthogonal frequency division multiplexing (OFDM), discrete multitone (DMT), etc.) such as may be used within a wireless personal area network (WPAN), a wireless local area network (WLAN), a wireless metropolitan are network (WMAN), a wireless wide area network (WWAN), a cellular network, a third generation (3G) network, a fourth generation (4G) network, a universal mobile telephone system (UMTS), and like communication systems, without limitation.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. An apparatus, including:
    a wireless communication module (WCM) to communicatively couple to a wireless access point;
    a power logic module to control transmission power of the WCM;
    a WCM transmitter coupled to the power logic module to transmit information to the wireless access point to disable an Automatic Power-Save Delivery (APSD) mode, the WCM transmitter to open a voice signal traffic stream as an uplink to the wireless access point, wherein the WCM transmitter is to transmit a voice stream on the uplink in an APSD mode;
    a WCM receiver coupled to the power logic module to receive information on a downlink from the wireless access point,
    wherein transmission of the voice signal traffic stream on the uplink triggers receipt of buffered voice packets on the downlink in a non-APSD mode; and
    an APSD logic module to establish a dynamic configuration mechanism to change from between the APSD mode and the non-APSD mode affecting voice signaling traffic at a beginning of the receipt of the buffered voice packets,
    wherein the WCM configures an access-category voice (AC-VO) for voice and an access-category IV (AC-IV) for signaling as trigger-enabled and delivery-enabled access categories in the APSD mode by transmitting an add traffic stream (ADDTS) control packet when opening the voice signal traffic stream, and
    wherein upon ending of a voice call, the WCM configures both the AC-VO and the AC-IV in the non-APSD mode by transmitting a delete traffic stream (DELTS) control packet.

2. A method, including:
    operating a wireless communication module (WCM) associated with a wireless portable electronic device (WPED) in an automatic power-save delivery (APSD)

disabled mode, wherein the WCM is wirelessly associated with a wireless access point;

operating a power logic module to control transmission power of the WCM;

transmitting to the wireless access point to disable an APSD mode;

opening a voice signal traffic stream as an uplink to the wireless access point;

transmitting the voice signal traffic stream in the APSD disabled mode;

transmitting a voice stream on the uplink in the APSD enabled mode;

receiving information on a downlink from the wireless access point;

receiving buffered voice packets on the downlink in the APSD disabled mode in response to transmitting the voice signal traffic stream on the uplink;

upon sensing that a voice over Internet protocol (VoIP) voice packet stream is ready for transmission from the WCM, operating the WCM in an APSD enabled mode; and upon terminating the transmission of the VoIP voice packet stream, transitioning from the APSD enabled mode to a legacy power save mode until receipt of another VoIP packet stream for transmission, wherein the WCM configures an access-category voice (AC-VO) for voice and an access-category IV (AC-IV) for signaling as trigger-enabled and delivery-enabled access categories in APSD enabled mode by transmitting an add traffic stream (ADDTS) control packet when opening the voice signal traffic stream, and wherein upon ending of a voice call, the WCM configures both the AC-VO and the AC-IV in APSD disabled mode by transmitting a delete traffic stream (DELTS) control packet.

3. The method of claim 2, wherein the WCM operates according to

Institute of Electrical and Electronic Engineers standard 802.11E.

4. The method of claim 2, wherein the APSD disabled mode comprises operating the WCM using a power saving mode that includes:

not delivering downlink voice signaling traffic in response to either uplink voice traffic or uplink voice signaling traffic;

not using the uplink voice signaling traffic to trigger a delivery of either downlink voice traffic or the downlink voice signaling traffic;

not delivering the downlink voice traffic in response to either the uplink voice traffic or the uplink voice signaling traffic; and not using the uplink voice traffic to trigger a delivery of either the downlink voice traffic or the downlink voice signaling traffic.

5. The method of claim 2, further including:

sending at least one traffic stream specification (TSPEC) control packet from the WCM to the wireless access point to advise the wireless access point to operate in the APSD disabled mode, wherein an APSD bit associated with the TSPEC control packet is reset.

6. The method of claim 2, wherein the APSD enabled mode comprises:

delivering downlink voice signaling traffic in response to uplink voice traffic;

not using uplink voice signaling traffic to trigger a delivery of either downlink voice traffic or the downlink voice signaling traffic;

delivering the downlink voice traffic in response to the uplink voice traffic; and using the uplink voice traffic to trigger a delivery of at least one of the downlink voice traffic or the downlink voice signaling traffic.

7. The method of claim 2, further including:

sending at least one traffic stream specification (TSPEC) control packet from the WCM to the wireless access point to advise the wireless access point to operate in the APSD enabled mode, wherein an APSD bit associated with the TSPEC control packet is set.

8. The method of claim 2, wherein the APSD enabled mode comprises an unscheduled APSD mode of operation.

9. The method of claim 2, wherein the APSD enabled mode comprises disabling at least one of transmitter operation or receiver operation at the WCM for a sleep period if no traffic is pending transmission from either the WPED or from the wireless access point.

* * * * *